No. 638,046. Patented Nov. 28, 1899.
W. J. M. DOBSON.
PORTABLE PNEUMATIC STIRRER.
(Application filed July 26, 1899.)
(No Model.)
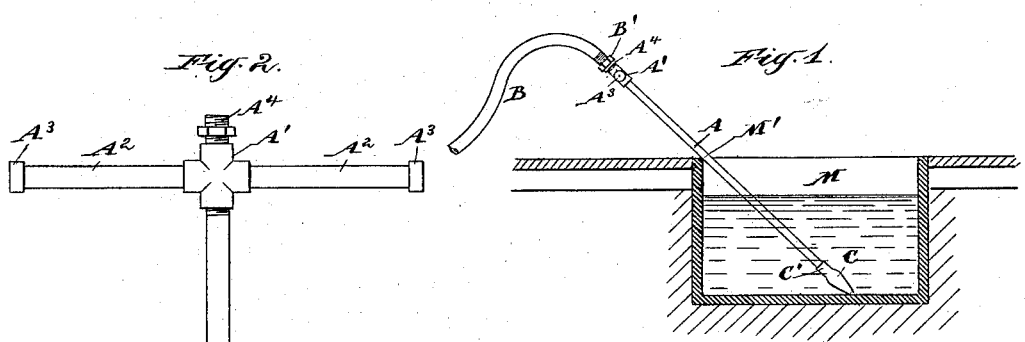
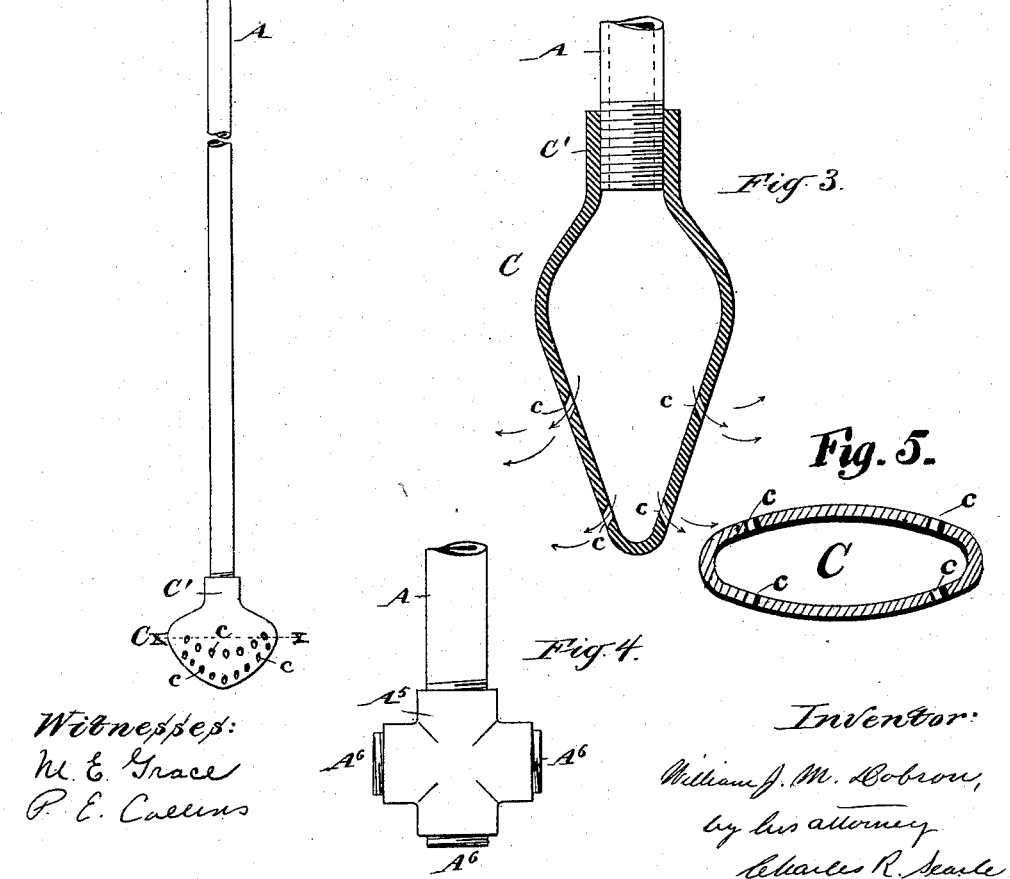
Witnesses:
M. E. Grace
P. E. Collins
Inventor:
William J. M. Dobson,
by his attorney
Charles R. Searle

UNITED STATES PATENT OFFICE.

WILLIAM J. M. DOBSON, OF NEW YORK, N. Y.

PORTABLE PNEUMATIC STIRRER.

SPECIFICATION forming part of Letters Patent No. 638,046, dated November 28, 1899.

Application filed July 26, 1899. Serial No. 725,128. (No model.)

*To all whom it may concern:*

Be it known that I, WILLIAM J. M. DOBSON, a citizen of the United States, residing in the city of New York, borough of Brooklyn, in the county of Kings and State of New York, have invented a certain new and useful Improvement in Portable Pneumatic Stirrers, of which the following is a specification.

The invention relates more particularly to means for stirring or changing the positions of hides and skins in tanning processes and the scraps in glue manufacture and for agitating the liquors in which they are treated. The use of air-currents in these processes has been long and favorably known. They are usually introduced through coils or systems of perforated pipes placed permanently in the vats.

The object of this invention is to provide a portable implement easily transferred from one vat to another by which the contents may be stirred to offer new surfaces for treatment by the liquor and through which compressed air may be forced to agitate the liquor, and thus hasten its action, while avoiding the expense and other objectionable features attending the use of fixed pipes.

It consists of a pipe or tubular handle having sufficient length and stiffness to serve as a stirrer and a hollow flattened head fastened thereon provided with openings for the escape of air under pressure received through a flexible pipe or hose attached to the handle and connected to an air-reservoir. The handle is preferably equipped with cross-arms lying in the plane of the head, adapted to be conveniently grasped by the operator in thrusting the head into the vat below and among the hides or scraps, and thus effectively change their relative positions, the air at the same time issuing through the openings and inducing currents in the liquor, and thus effectually agitating the latter and causing it to act more rapidly upon the mass of hides or scraps.

The accompanying drawings form a part of this specification, and show the invention as I have carried it out.

Figure 1 is a sectional view of a vat on a small scale, showing the portable stirrer or agitating implement therein. Fig. 2 is an elevation of the implement alone on a larger scale. Fig. 3 is a sectional view taken longitudinally of the head portion in a plane perpendicular to the plane of Fig. 2. It is on a still larger scale. Fig. 4 shows a modified form of the post. It is a face view. Fig. 5 is a cross-section on the line $x\ x$ of Fig. 2.

Similar letters of reference indicate like parts in all the figures.

A is the tubular handle, which may be ordinary inch-and-a-half iron pipe screw-threaded at each end and of a length sufficient to reach to the bottom of the vat M on the far side, (see Fig. 1,) with a sufficient portion above to allow easy handling. In practice seven or eight feet is a convenient length to serve with ordinary vats. Upon the outer or upper end is screwed an ordinary cross connection A', the lateral openings receiving each an arm $A^2$, which may be also of pipe, preferably a little smaller than the handle and closed by the cap $A^3$. The remaining opening in the cross connection A' receives a screw-threaded nipple $A^4$, adapted to receive a coupling B' on the end of a hose B, bringing air under pressure from an air-compressor or other reservoir. (Not shown.)

C is the head, preferably a flattened heart-shaped casting, having an interiorly-screw-threaded boss C', by which it is secured upon the lower end of the pipe A. The head is closed, but is provided with rows of perforations $c$ on its upper and under faces, through which air flowing through the handle may escape. The point and edges of the head are preferably rounded to avoid injuring the material when used with hides or skins.

In using the implement the operator grasps the cross-arms $A^2$ and, holding them approximately horizontally, thrusts the head well down toward the bottom of the vat M into the mass of hides or scraps, as the case may be, and resting the handle A upon the edge M' of the vat as a fulcrum raises the head leverwise through the mass, and thus changes the positions of its parts. The air at the same time escaping through the perforations $c$ drives away the exhausted liquor in contact with the mass, its place being taken by comparatively fresh liquor circulating from other portions of the vat. The attendant continues the operation, occasionally shifting the implement to previously-undisturbed portions of the mass until the whole is sufficiently stirred, and then proceeds similarly to agitate the contents of a neighboring vat, the flexible hose B permitting the easy transfer of the implement from one to another, as desired.

The tool is simple in its construction and operation and performs its functions with great efficiency. By its employment the expensive coils of pipes heretofore used in the vats may be dispensed with, thus effecting a saving in first cost and, of even greater importance, avoiding the repairs due to rapid corrosion, and also very greatly reducing the labor and expense of cleansing the vats.

Modifications may be made in the forms and proportions within wide limits. The number and size of the perforations c may be varied, as may the dimensions and materials of the several parts.

Fig. 4 shows a form of connection or post $A^5$ in which a cross connection similar to A' is employed, its openings being partially filled by perforated plugs $A^6$.

The cross-arms, besides serving as convenient hand-grasps, indicate to the operator the position of the plane of the submerged head. They may be omitted, if preferred, in any case or other means substituted.

Although I have described the invention as applied to the art of tanning and to the manufacture of glue, it will be understood that it will serve with success in other operations to which it is adapted.

I claim—

1. The implement described, consisting of a tubular handle arranged to be coupled at one end to a hose, a flattened hollow head with rounded closed outer end and secured upon the other end of said handle, and having openings for the escape of air received through said hose, and cross-arms extending laterally from said handle in the plane of the head, all combined and adapted to serve with a vat and its contents, substantially as herein specified.

2. The tubular handle A, cross connection A', closed arms $A^2$ extending laterally therefrom, the nipple $A^4$, hose B and coupling B', in combination with the hollow flattened head C having the boss C' receiving said handle, a rounded closed lower end and the perforations c in each broadened face, all substantially as and for the purposes herein specified.

3. The implement described, consisting of the tubular handle A and laterally-extending arms $A^2$ thereon adapted to be grasped by the hands, in combination with a coupling B' at one end arranged to connect said handle to the hose B, the other end of said handle adapted to allow the escape of air received through said hose and a flattened hollow head on the end of said handle and provided with perforations in each broadened face, all substantially as and for the purposes herein specified.

In testimony that I claim the invention above set forth I affix my signature in presence of two witnesses.

WILLIAM J. M. DOBSON.

Witnesses:
CHARLES R. SEARLE,
C. E. COLLINS.